(12) United States Patent
Tahara et al.

(10) Patent No.: US 7,385,389 B2
(45) Date of Patent: Jun. 10, 2008

(54) ABSOLUTE ROTARY ENCODER AND MICROMETER

(75) Inventors: Tomohiro Tahara, Kawasaki (JP);
Shozaburo Tsuji, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 100 days.

(21) Appl. No.: 11/406,273

(22) Filed: Apr. 19, 2006

(65) Prior Publication Data
US 2006/0250128 A1    Nov. 9, 2006

(30) Foreign Application Priority Data
Apr. 19, 2005    (JP)    ............... 2005-120819

(51) Int. Cl.
  *G01B 7/30*    (2006.01)
  *H01F 5/00*    (2006.01)
(52) U.S. Cl. ..................... 324/207.17; 324/207.25
(58) Field of Classification Search ........... 324/207.11, 324/207.15, 207.17, 207.23, 207.25, 207.18; 341/15; 33/1 PT; 340/870.32
See application file for complete search history.

(56) References Cited

U.S. PATENT DOCUMENTS

| | | | | |
|---|---|---|---|---|
| 3,812,481 A | | 5/1974 | Stedtnitz | |
| 5,804,963 A | * | 9/1998 | Meyer | 324/207.17 |
| 6,011,389 A | * | 1/2000 | Masreliez et al. | 324/207.17 |
| 6,111,402 A | | 8/2000 | Fischer | |
| 6,522,128 B1 | * | 2/2003 | Ely et al. | 324/207.17 |
| 7,190,158 B2 | * | 3/2007 | Tiemann | 324/207.17 |

FOREIGN PATENT DOCUMENTS

JP    A 10-213407    8/1998

* cited by examiner

*Primary Examiner*—Reena Aurora
*Assistant Examiner*—Kenneth J Whittington
(74) *Attorney, Agent, or Firm*—Oliff & Berridge, PLC

(57) ABSTRACT

An absolute rotary encoder comprises a rotor having a bore passing through the center thereof to receive a shaft therein and arranged rotatably about the shaft and opposite a stator. Tracks are arranged concentrically on the rotor to form a track group. A transmitting winding group is arranged on the stator as capable of flux coupling with the track group. A receiving winding group is arranged on the stator as capable of flux coupling with the track group. Each track in the track group comprises a flux coupling winding that includes linear arc portions having first and second radii and arranged alternately on the rotor and has the shape of a ring continuous about the shaft. At least two tracks in the track group have the linear arc portions different in number from each other.

10 Claims, 7 Drawing Sheets

ABSOLUTE ROTARY ENCODER AND MICROMETER

CROSS REFERENCE TO RELATED APPLICATION

This application is based on and claims the benefit of priority from prior Japanese Patent Application No. 2005-120819, filed on Apr. 19, 2005, the entire contents of which are incorporated herein by reference.

BACKGROUND OF THE INVENTION

1. Field of the Invention

The present invention relates to an absolute rotary encoder operative to measure displacements through the use of flux coupling, and a micrometer including the encoder mounted thereon.

2. Description of the Related Art

A rotary encoder comprises a stat or having transmitting windings and receiving windings arranged thereon, and a rotor having tracks arranged thereon as capable of flux coupling with these windings. Such the encoder includes the absolute type as disclosed in JP-A 10-213407 (FIGS. 2 and 3) and U.S. Pat. No. 3,812,481 (column 5, line 68 to column 6, line 3; column 7, lines 31-35; FIGS. 1 and 2). In particular, the latter discloses a relatively large rotary encoder, which is applicable to control of internal combustion engines. Installation of the stator and the rotor into an enclosure may cause a displacement of the stator or the rotor. In this case, regardless of the size of the absolute rotary encoder, the extent of magnitude of the displacement is almost same. Therefore, downsizing the absolute rotary encoder results in an increase in influence from the displacement and causes a reduction in measurement accuracy.

The present invention has an object to provide an absolute rotary encoder capable of achieving accurate measurements even if it is downsized and a micrometer including the encoder mounted thereon.

SUMMARY OF THE INVENTION

The present Invention provides an absolute rotary encoder, comprising: a shaft; a stator; a rotor having a bore passing through the center thereof to receive the shaft therein and arranged rotatably about the shaft and opposite the stator; a track group including tracks arranged concentrically on the rotor; a transmitting winding group arranged on the stator as capable of flux coupling with the track group; and a receiving winding group arranged on the stator as capable of flux coupling with the track group, wherein each track in the track group comprises a flux coupling winding that includes linear arc portions having first and second radii and arranged alternately on the rotor and has the shape of a ring continuous about the shaft, wherein the track group includes at least two tracks having the linear arc portions different in number from each other.

In the absolute rotary encoder according to the present invention, each track comprises a flux coupling winding that includes linear arc portions having first and second radii and arranged alternately on the rotor and has the shape of a ring continuous about the shaft. Therefore, even if the absolute rotary encoder is downsized, it is possible to prevent the intensity of the received signal from lowering and reduce the influence from the displacement of the stator or the rotor.

In the present invention, the transmitting winding group may be located more outward than the innermost receiving winding among a plurality of receiving windings contained in the receiving winding group. In this case, a transmitting winding is omitted, which is otherwise located more inward than the most inwardly located receiving winding. Accordingly, the absolute rotary encoder can be downsized.

In the present invention, the transmitting winding group may comprise transmitting windings linked in a shape as drawn with one stroke. In this case, a transmitting winding driver can be shared to drive every transmitting winding. Accordingly, the absolute rotary encoder can be downsized. The absolute rotary encoder can be mounted on a micrometer.

In accordance with the present invention, it is possible even for a downsized absolute rotary encoder to prevent the intensity of the signal received at the receiving windings from lowering and reduce the influence from the displacement of the stator or the rotor. Therefore, an accurate, downsized absolute rotary encoder can be realized.

DETAILED DESCRIPTION OF THE INVENTION

Figure 1:
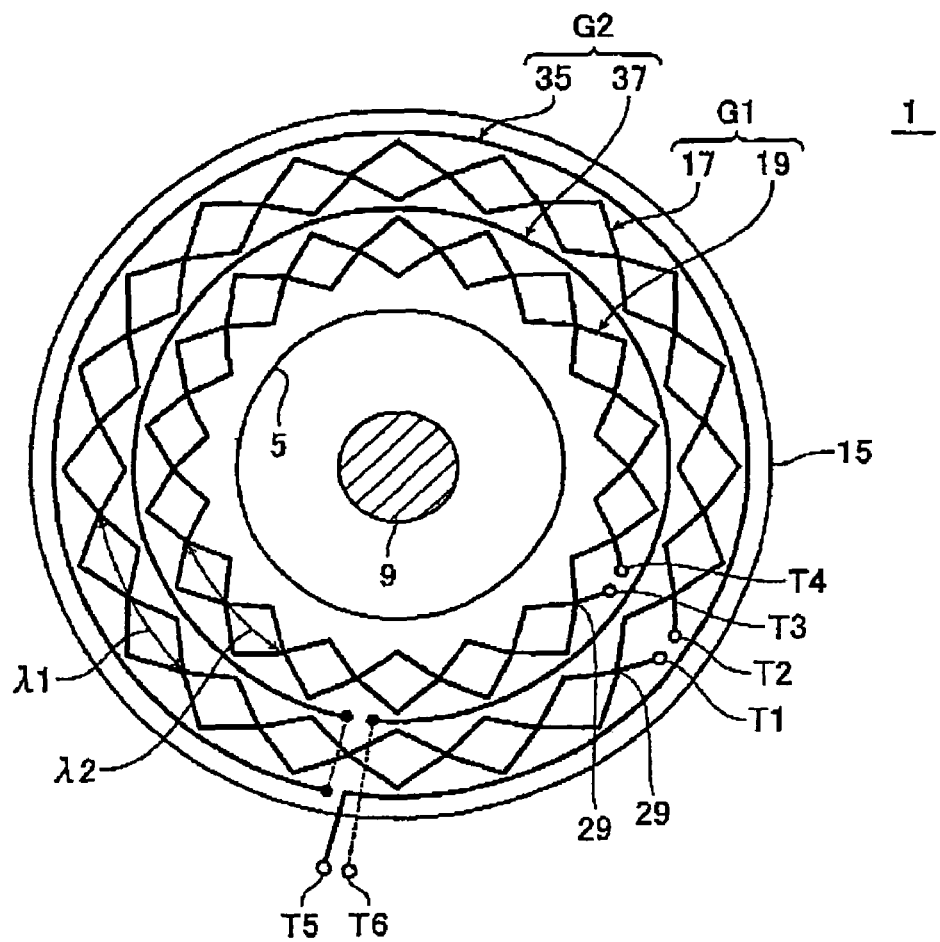
FIG. 1 is a plan view of a stator, which is a component of an absolute rotary encoder according to the embodiment.

An absolute rotary encoder according to the embodiment will now be described with reference to the drawings (hereinafter the "absolute rotary encoder" may also be referred to as the "encoder"). In the figures, the same parts as those denoted with the reference numerals in the figure once described are given the same reference numerals and omitted from the following description.

Figure 2:
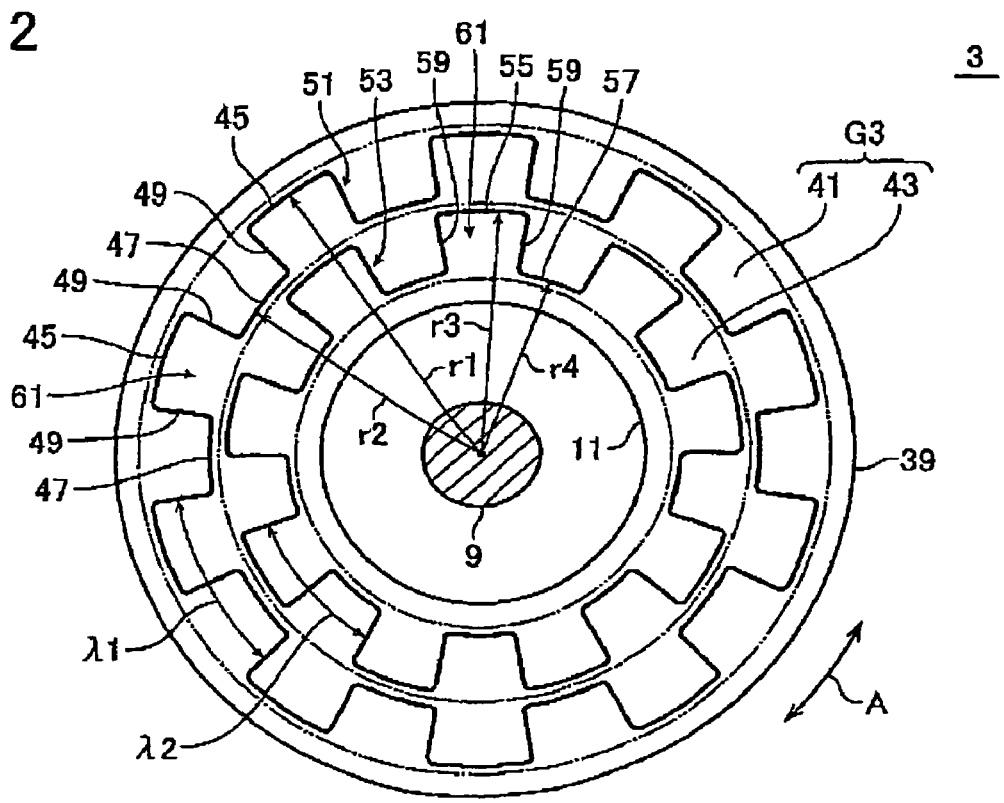
FIG. 2 is a plan view of a rotor, which is a component of the absolute rotary encoder according to the embodiment.

FIG. 1 is a plan view of a stator 1, which is a component of the absolute rotary encoder according to the embodiment, and FIG. 2 is a plan view of a rotor 3. The stator 1 has a bore 5 formed through the center, and a shaft 9 passes through the bore 5. The rotor 3 also has a bore 11 through the center to receive the shaft 9 therein. The rotor 3 is arranged about the shaft 9 rotatably in the direction of the arrow A, interposing a rotor bush, not shown, fitted in the bore 11 therebetween, and opposite the stator 1. The stator 1 and the rotor 3 are composed of a printed circuit board, a glass substrate, a silicon substrate and so forth.

The stator 1 shown in FIG. 1 comprises an insulating substrate 15, on which receiving windings 17, 19 in the form of rings are formed about the shaft 9 concentrically. The receiving winding 17 locates outward, and the receiving winding 19 inward. The receiving winding 17 has terminals T1, T2, and receiving winding 19 terminals T3, T4. The receiving windings 17, 19 configure a receiving winding group G1. The receiving winding 17 is taken as an example to describe a configuration of the receiving winding.

Figure 3:
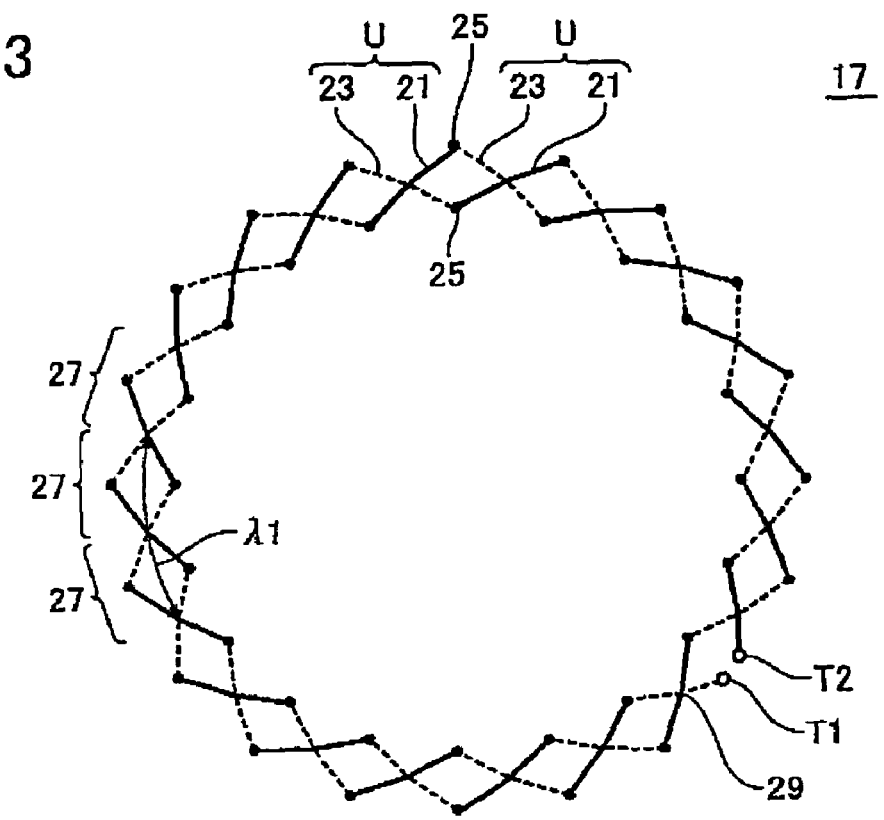
FIG. 3 is a plan view of an example of a receiving winding arranged on the stator shown in FIG. 1.

FIG. 3 is a plan view of the receiving winding 17. The receiving winding 17 includes a set U of an upper conductor 21 and a lower conductor 23 that intersects the upper conductor three-dimensionally, and plural such sets are arranged in a ring. An insulator layer, not shown, is located between the upper conductor 21 and the lower conductor 23. This insulator layer has a through-hole or via-hole formed therethrough to receive a buried conductor 25 therein, through which an end of the upper conductor 21 is connected to an end of the lower conductor 23. In other words, the receiving winding 17 includes a plurality of approximately diamond receiving loops 27, which are arranged in a ring.

Figure 4:
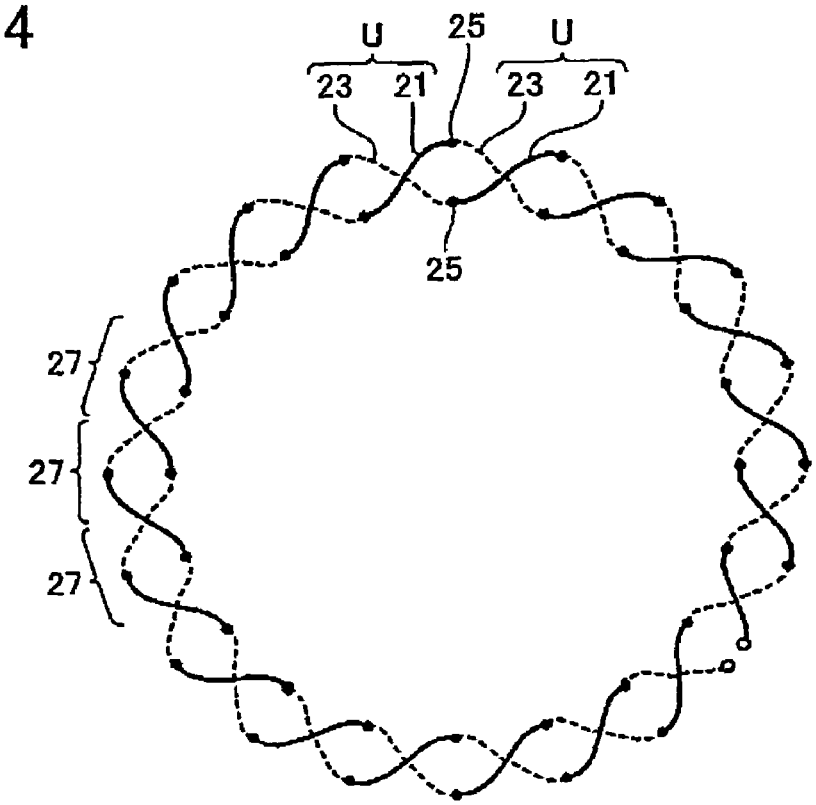
FIG. 4 is a plan view of another example of a receiving winding arranged on the stator shown in FIG. 1.

The receiving loop 27 may be formed in various closed-loop shapes such as the shape of an almost sinusoidal wave. FIG. 4 is a plan view of a receiving winding composed of receiving loops 27 in the shape of an almost sinusoidal wave. This may be employed as the receiving windings 17, 19 arranged on the stator 1 shown in FIG. 1.

Figure 5:
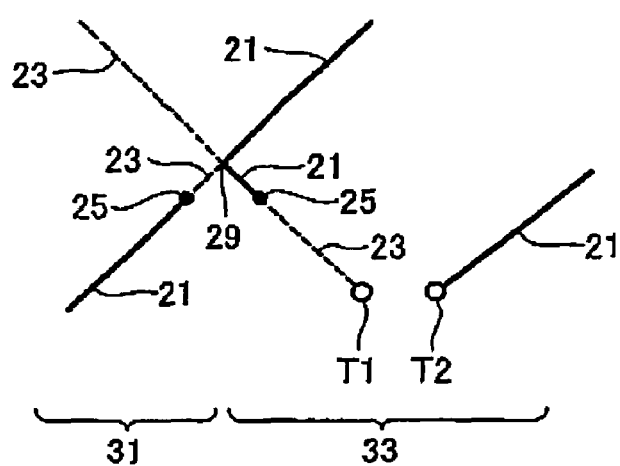
FIG. 5 is a plan view of a receiving folded portion and vicinity of the receiving winding shown in FIG. 3.

FIG. 5 is a plan view in the vicinity of a receiving folded portion 29 of the receiving winding 17. The receiving folded portion 29 is formed at two positions both the front 31 and the rear 33 of the receiving winding 17. In more detail, in the front 31 the lower conductor 23 is folded at the receiving folded portion 29, and in the rear 33 the upper conductor 21 is folded at the receiving folded portion 29. The receiving folded portion 29 in the front 31 is the lower conductor 23 and the receiving folded portion 29 in the rear 33 is the upper conductor 21. Therefore, The receiving folded portion 29 in the front 31 is not connected to the receiving folded portion 29 In the rear 33.

The receiving winding 19 of FIG. 1 has the same configuration as that of the receiving winding 17 except that an angle of rotation corresponding to the wavelength $\lambda_2$ of the receiving winding 19 is different from that corresponding to the wavelength $\lambda_1$ of the receiving winding 17.

The stator 1 includes transmitting windings 35, 37 as shown in FIG. 1, which are arranged more outward than the receiving winding 17, and between the receiving winding 17 and the receiving winding 19, respectively. The transmitting windings 35, 37 are configured such that linear conductors with a constant curvature are formed in the shape of rings on the insulating substrate 15. The transmitting winding 35 and the transmitting winding 37 are linked in a shape as drawn with one stroke to configure a transmitting winding group G2. As a result, a transmitting winding driver can be shared to drive the transmitting windings 35, 37 at the same time. Accordingly, the encoder can be downsized. T5, T6 denote terminals of the transmitting winding group G2.

The transmitting winding group G2 is located more outward than the receiving winding 19, that is, more outward than the innermost receiving winding among the receiving windings 17, 19 contained in the receiving winding group G1. In this way, a transmitting winding, which is otherwise located more inward than the receiving winding 19, is omitted to downsize the absolute rotary encoder.

FIG. 2 is referenced next to describe a configuration of the rotor 3. The rotor 3 includes an insulating substrate 39 in the shape of a disc. Tracks 41, 43 are formed on the insulating substrate 39 concentrically. The track 41 is located outward and made capable of flux coupling with the receiving winding 17 and the transmitting winding group G2. To the contrary, the track 43 is located inward and made capable of flux coupling with the receiving winding 19 and the transmitting winding group G2. The tracks 41, 43 configure a track group G3.

A configuration of the track group G3 is described taking the track 41 as an example. Linear arc portions 45 with a radius $r_1$ (an example of the first radius) and linear arc portions 47 with a smaller radius $r_2$ (an example of the second radius) are arranged alternately by tens. The linear arc portions 45, 47 are connected with each other using linear portions 49 extending in the radial direction of the rotor 3 to configure a flux coupling winding 51 in the shape of a ring continuous about the shaft 9. This flux coupling winding 51 serves as the track 41. The flux coupling winding 51 has a wavelength $\lambda_1$, which is equal to the wavelength $\lambda_1$ of the receiving winding 17.

The flux coupling winding 53 serving as the track 43 comprises linear arc portions 55 with a radius $r_3$ (an example of the first radius) smaller than the radius $r_2$, and linear arc portions 57 with a much smaller radius $r_4$ (an example of the second radius), which are arranged alternately by nines. The linear arc portions 55, 57 are connected with each other using linear portions 59. The flux coupling winding 53 has a wavelength $\lambda_2$, which is equal to the wavelength $\lambda_2$ of the receiving winding 19. Thus, the flux coupling windings 51, 53 have patterns in the shape of gears.

A linear arc portion 45 and linear portions 49 at both sides thereof configure a block 61, and a linear arc portion 55 and linear portions 59 at both sides thereof configure a block 61. The number of blocks 61 is equal to ten in the outer track 41 and nine in the inner track 43.

In the encoder according to the embodiment comprising the stator 1 of FIG. 1 and the rotor 3 of FIG. 2, the outer track 41 is different from the inner track 43 in number of blocks 61. Accordingly, on the basis of a difference between signals obtained from the receiving windings 17, 19, absolute positions of the rotor 3 within one rotation can be detected.

Figure 6:
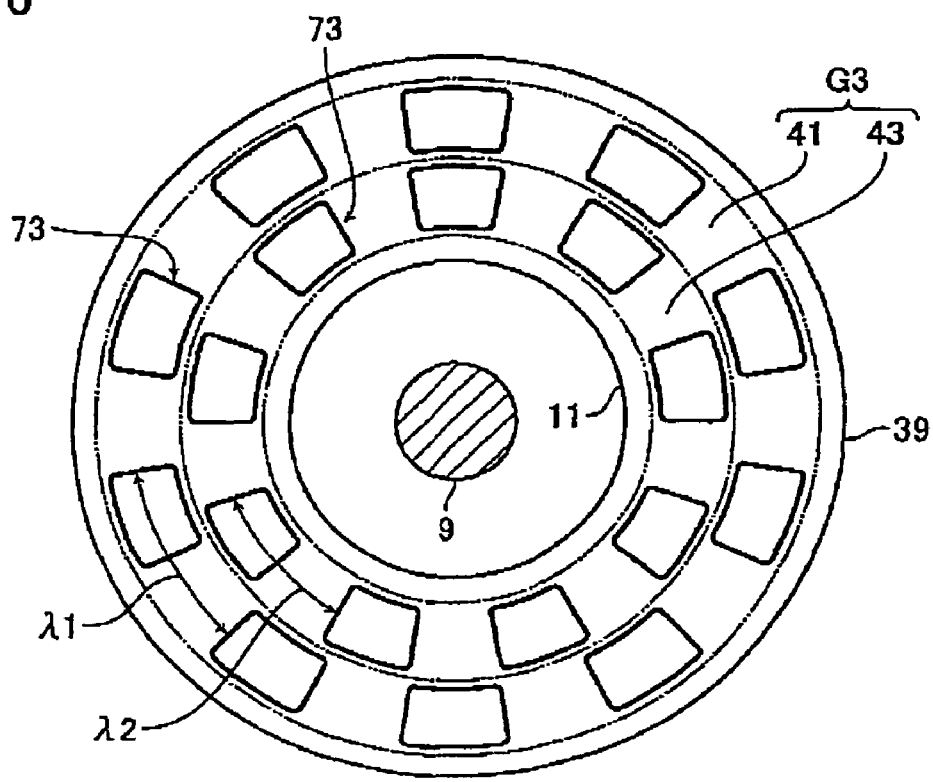
FIG. 6 is a plan view of a rotor, which is a component of an absolute rotary encoder according to a comparative example.

A major effect of the embodiment is described next in comparison with a comparative example. FIG. 6 is a plan view of a rotor 71 according to the comparative example, which corresponds to FIG. 2. The rotor 71 differs from the rotor 3 in configuration of tracks. In the rotor 71 the track 41 includes ten flux coupling windings 73 arranged at a certain pitch while the track 43 includes nine flux coupling windings 73 arranged at a certain patch. A flux coupling winding 73 is shaped in an almost rectangular frame.

The encoder equipped with the rotor 3 according to the embodiment and the encoder equipped with the rotor 71 according to the comparative example are employed to measure the size of a certain object to be measured under the following condition. The tracks 41 and 43 have respective radii of 7.4 mm and 6.3 mm, the rotation center of the rotor is deviated about 100 μm from the stator, and a tilt is deviated about 25 μm at the track 41.

Figure 7:
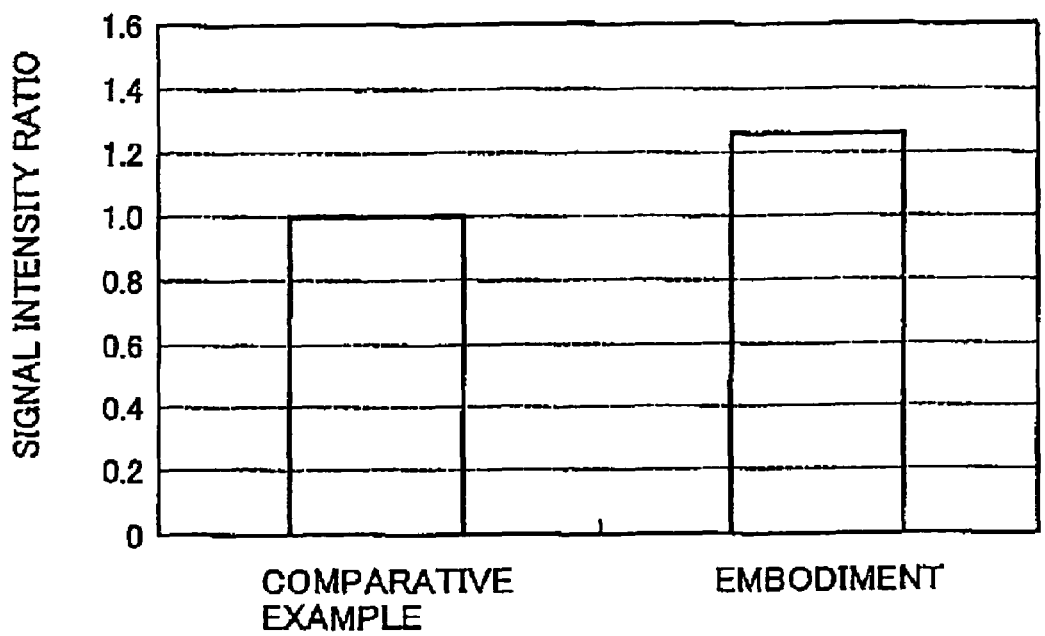
FIG. 7 is a graph showing measured results of the signal intensity.
Figure 8:
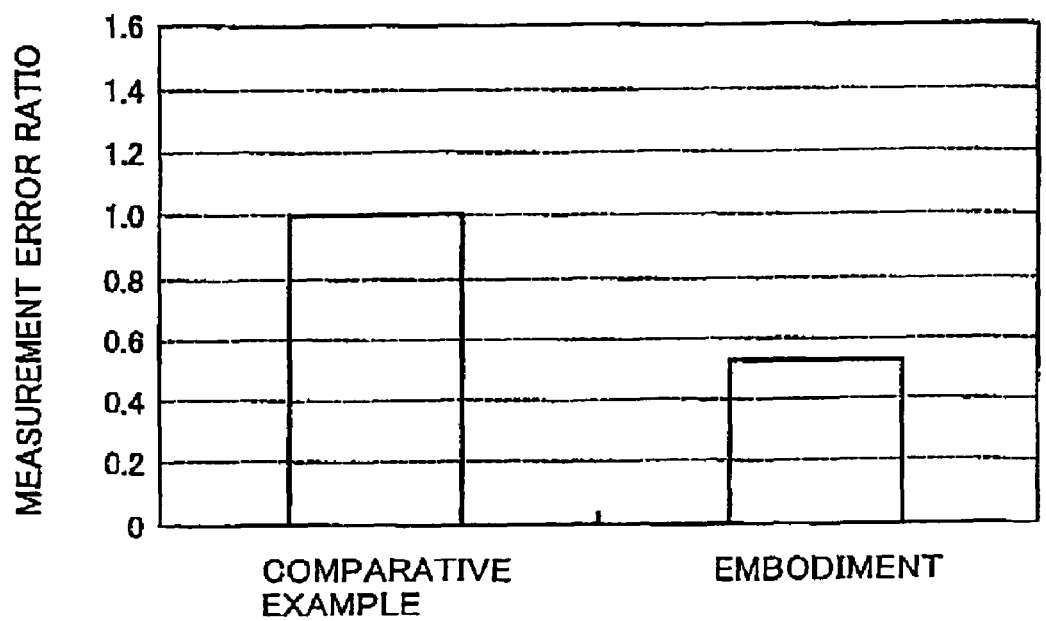
FIG. 8 is a graph showing results of measurement errors of the size.

During the above measurement, intensities of signals, obtained from the receiving windings as well as measurement errors of the size are acquired. FIG. 7 is a graph showing measured results of the signal intensity, and FIG. 8 is a graph showing results of measurement errors of the size. The signal intensity is described first. The graph of FIG. 7 shows the signal intensity in the embodiment represented by a ratio to the signal intensity in the comparative example, which is determined to have a value of one.

In the embodiment it is possible to achieve about 1.2 times the signal intensity of the comparative example. As described in the column of the subject to be solved by the invention, if the absolute rotary encoder is downsized, the current induced in tracks by flux coupling with the transmitting winding is made smaller, and received signals with sufficient intensities can not be obtained from the receiving windings.

The embodiment is provided with the tracks 41, 43 including flux coupling windings 51, 53 each in the shape of a ring (in the form of a gear) continuous as shown in FIG. 2. Accordingly, signals can be efficiently transmitted from the transmitting winding group G2 to the track group G3. Therefore, the intensity of the received signal can be enhanced. Thus, it is possible to obtain received signals with sufficient intensities from the receiving windings even if the encoder is downsized.

The following description is given to the measurement errors of the size. FIG. 8 shows the measurement error in the embodiment by a ratio to the measurement error in the comparative example, which is determined to have a value of one. In the embodiment it is possible to achieve an improvement of about 50% in measurement accuracy compared to the comparative example.

Figure 9:
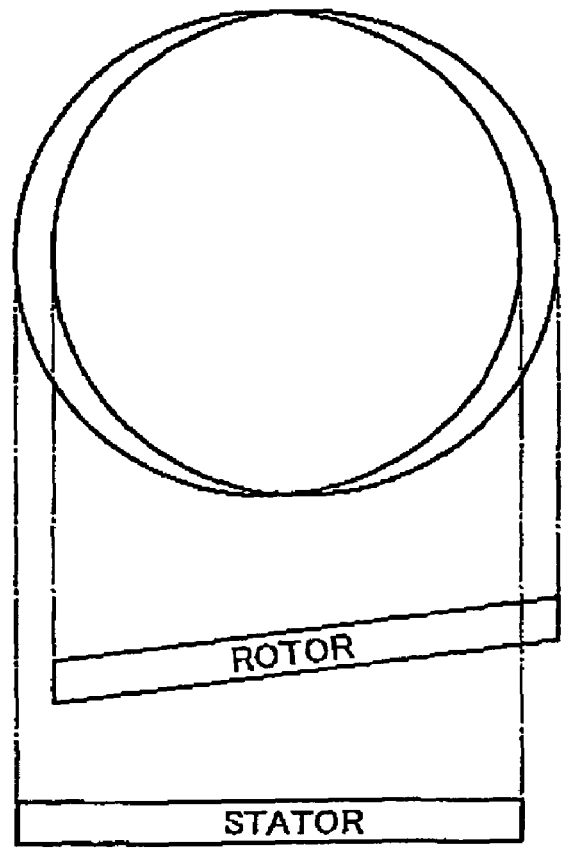
FIG. 9 shows a displacement of the rotor relative to the stator.

In the embodiment it Is possible to reduce the measurement error due to the displacement of the rotor or the stator. The reason may be considered as follows. When the attached place of the rotor is displaced from the stator as shown in FIG. 9, the distance between the stator and the rotor becomes different in accordance with the position of the track. In this case, current flows in the tracks as considered below.

Figure 10:
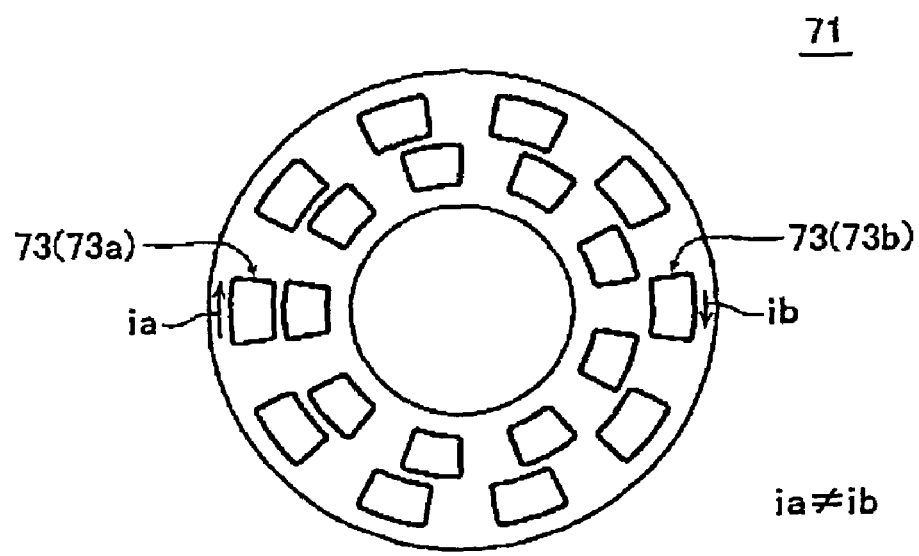
FIG. 10 shows current flowing in tracks when the rotor in the comparative example is displaced.

As shown in FIG. 10, in the rotor 71 of the comparative example, a track includes a plurality of flux coupling windings 73 separated from each other, in which induced currents with different intensities flow, respectively. For example, an induced current 1*a* flowing in a flux coupling winding 73*a* differs in intensity from an induced current 1*b* flowing in a flux coupling winding 73*b*. Therefore, the induced currents have different intensities in accordance with positions of the track, which may cause a reduction in measurement accuracy. For example, even the same displacement of 0.1 mm exerts a larger influence if the encoder is downsized.

Figure 11:
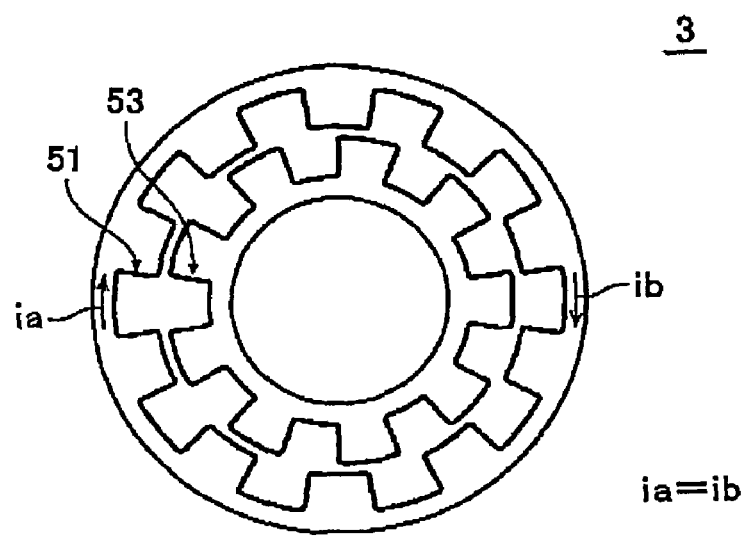
FIG. 11 shows current flowing in tracks when the rotor in the embodiment is displaced.

To the contrary, in the rotor 3 of the embodiment, the flux coupling winding 51, 53 in one track is in the shape of a continuous ring as shown in FIG. 11. Accordingly, the induced current flowing in the track does not differ in accordance with positions of the track and can be made uniform. Therefore, in the embodiment it is possible to reduce the measurement error due to the displacement of the stator or the rotor.

As described above, in the embodiment, even if the encoder is downsized, it is possible to prevent the intensity of the received signal from lowering and reduce the influence from the displacement of the stator or the rotor. Accordingly, it is possible to realize a downsized absolute rotary encoder capable of achieving accurate measurements.

Figure 12:
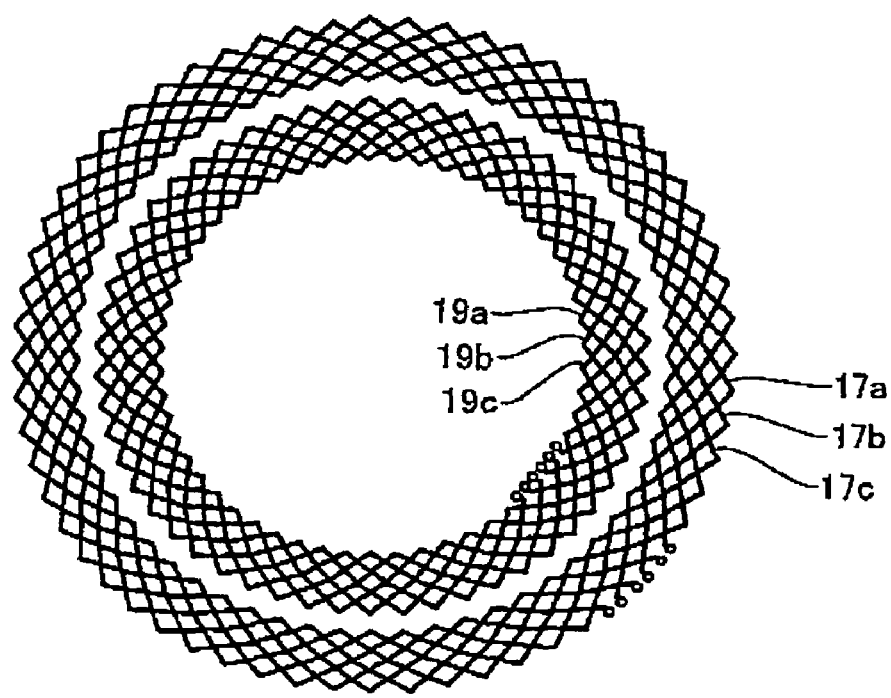
FIG. 12 is a plan view of three-phase receiving windings applicable to the embodiment.

In the example described above, one receiving winding 17, 19 is provided corresponding to each track (in the case of one-phase receiving winding) as shown in FIG. 1. To the contrary, three receiving windings may be provided corresponding to each track (in the case of three-phase receiving windings) as shown in FIG. 12. In the latter, three receiving windings 17*a*, 17*b*, 17*c* arranged with different phases shifted from each other correspond to one track, and three receiving windings 19*a*, 19*b*, 19*c* arranged with different phases shifted from each other correspond to the other track. Further, although it is not shown, two or four receiving windings may be provided corresponding to each track (in the case of two- or four-phase receiving windings).

Figure 13:
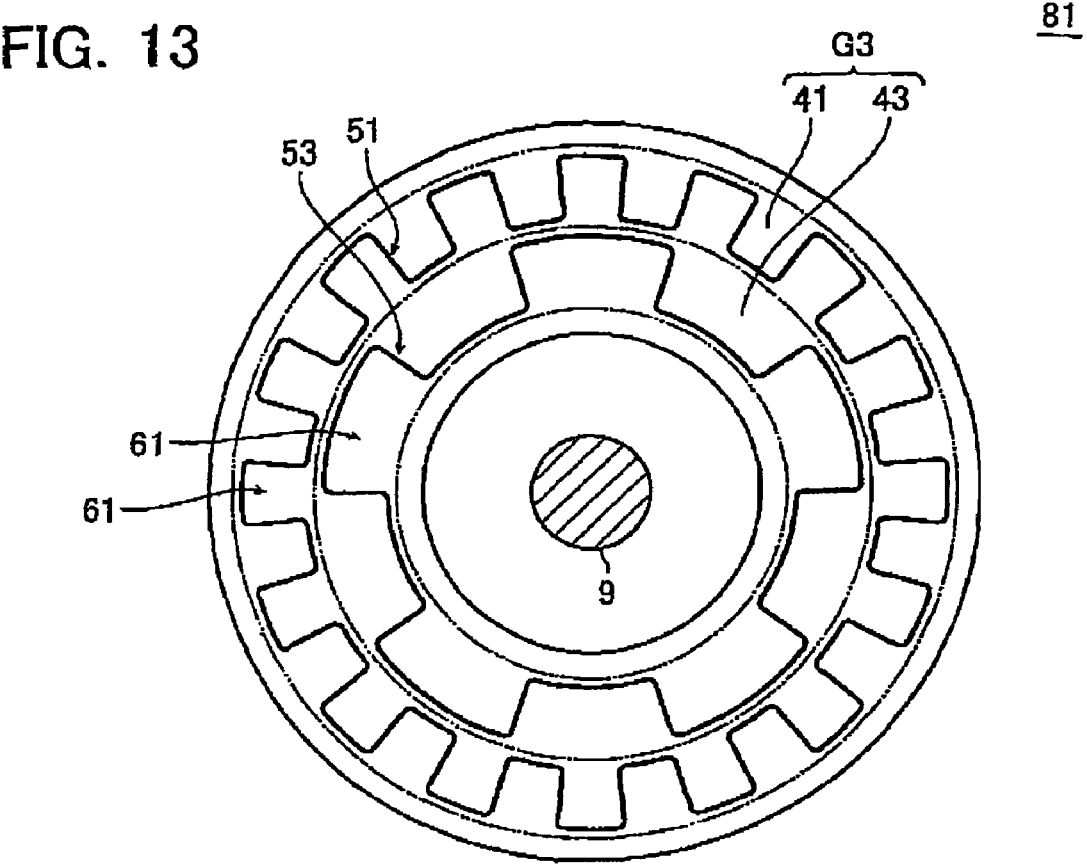
FIG. 13 is a plan view of another example of the rotor applicable to the embodiment.

The rotor 3 is not limited to the configuration shown in FIG. 2 but may have a configuration shown in FIG. 13. In this case, a rotor 81 includes an outer track 41 having sixteen blocks 61 and an inner track 43 having five blocks 61.

Two tracks are contained in the track group G3 in the described example though three or more tracks may be contained. In this case, at least two tracks in the track group G3 may have blocks 61 (that is, the linear arc portions), which are different in number from each other.

Figure 14:
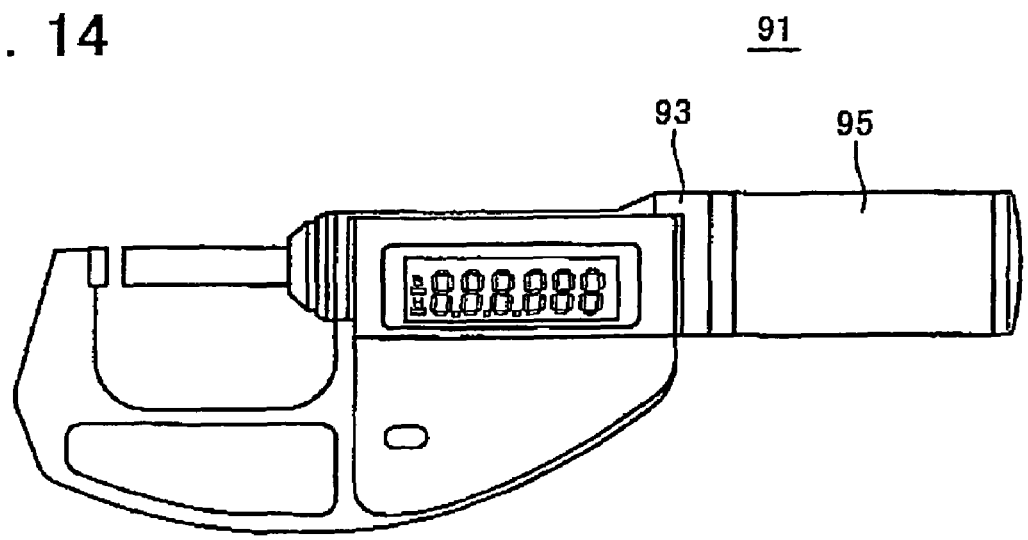
FIG. 14 is a front view of a micrometer equipped with the absolute rotary encoder according to the embodiment.

FIG. 14 is a front view of a micrometer 91 equipped with the absolute rotary encoder according to the embodiment. The stator 1 of FIG. 1 is fixed to a frame 93, and the rotor 93 of FIG. 2 is fixed to a thimble 95. In the embodiment it is possible to achieve accurate measurements even if the micrometer 91 is downsized such that the rotor 3 has a diameter of 20 mm or below, for example.

What is claimed is:

1. An absolute rotary encoder, comprising:
   a shaft;
   a stator;
   a rotor having a bore passing through the center thereof to receive the shaft therein and arranged rotatably about the shaft and opposite the stator;
   a track group including tracks arranged concentrically on the rotor;
   a transmitting winding group arranged on the stator as capable of flux coupling with the track group; and
   a receiving winding group arranged on the stator as capable of flux coupling with the track group,
   wherein each track in the track group comprises a flux coupling winding that includes linear are portions having first and second radii and arranged alternately on the rotor and has the shape of a ring continuous about the shaft,
   wherein the track group includes at least two tracks having the linear are portions different in number from each other,
   wherein the transmitting winding group is located more outward than the innermost receiving winding among a plurality of receiving windings contained in the receiving winding group.

2. The absolute rotary encoder according to claim 1, wherein the transmitting winding group comprises transmitting windings linked in a shape as drawn with one stroke.

3. The absolute rotary encoder according to claim 1, wherein the receiving windings contained in the receiving winding group include an outer receiving winding and an inner receiving winding, said outer receiving winding having a larger angle of rotation corresponding its wavelength than that corresponding to the wavelength of said inner receiving winding.

4. The absolute rotary encoder according to claim 1, wherein the plurality of receiving windings are arranged with different phases corresponding to the respective tracks.

5. A micrometer including the absolute rotary encoder according to claim 1 mounted thereon.

6. An absolute rotary encoder, comprising:
   a shaft;
   a stator;
   a rotor having a bore passing through the center thereof to receive the shaft therein and arranged rotatably about the shaft and opposite the stator;
   a track group including tracks arranged concentrically on the rotor;
   a transmitting winding group arranged on the stator as capable of flux coupling with the track group; and
   a receiving winding group arranged on the stator as capable of flux coupling with the track group,
   wherein each track in the track group comprises a flux coupling winding that includes linear arc portions having first and second radii and arranged alternately on the rotor and has the shape of a ring continuous about the shaft, wherein the track group includes at least two tracks having the linear arc portions different in number from each other, wherein each of the receiving windings contained in the receiving winding group includes a plurality of receiving loops in the form of closed-loops arranged in a ring.

7. A micrometer including the absolute rotary encoder according to claim 6 mounted thereon.

8. The absolute rotary encoder according to claim 6, wherein the transmitting winding group comprises transmitting windings linked in a shape as drawn with one stroke.

9. The absolute rotary encoder according to claim 6, wherein the receiving windings contained in the receiving winding group include an outer receiving winding and an inner receiving winding, said outer receiving winding having a larger angle of rotation corresponding its wavelength than that corresponding to the wavelength of said inner receiving winding.

10. The absolute rotary encoder according to claim 6, wherein the plurality of receiving windings are arranged with different phases corresponding to the respective tracks.

* * * * *